United States Patent
Jin et al.

(10) Patent No.: US 10,404,629 B2
(45) Date of Patent: Sep. 3, 2019

(54) AUTOMATIC REPLY METHOD, DEVICE, APPARATUS, AND STORAGE MEDIUM

(71) Applicant: PING AN TECHNOLOGY (SHENZHEN) CO., LTD., Shenzhen, Guangdong (CN)

(72) Inventors: Ge Jin, Guangdong (CN); Jie Zhang, Guangdong (CN); Jing Xiao, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 3 days.

(21) Appl. No.: 15/578,227

(22) PCT Filed: Mar. 24, 2017

(86) PCT No.: PCT/CN2017/077963
§ 371 (c)(1),
(2) Date: Nov. 29, 2017

(87) PCT Pub. No.: WO2018/014579
PCT Pub. Date: Jan. 25, 2018

(65) Prior Publication Data
US 2018/0359197 A1    Dec. 13, 2018

(30) Foreign Application Priority Data

Jul. 20, 2016   (CN) .......................... 2016 1 0578824

(51) Int. Cl.
*H04L 12/58* (2006.01)
*G06F 17/18* (2006.01)
(Continued)

(52) U.S. Cl.
CPC .............. *H04L 51/02* (2013.01); *G06F 17/18* (2013.01); *G06F 17/27* (2013.01); *G06N 20/00* (2019.01); *H04L 51/046* (2013.01); *H04L 51/16* (2013.01)

(58) Field of Classification Search
CPC ....... H04L 51/02; H04L 51/046; H04L 51/24; G06F 17/16; G06F 17/18; G06F 17/27; G06N 20/00
(Continued)

(56) References Cited

U.S. PATENT DOCUMENTS

| 7,818,374 B2 * | 10/2010 | Bates | ...................... H04L 67/38 370/252 |
| 2003/0182391 A1* | 9/2003 | Leber | .................... G06F 16/951 709/217 |

(Continued)

FOREIGN PATENT DOCUMENTS

| CN | 104750705 A | 7/2015 |
| CN | 105550679 A | 5/2016 |
| CN | 105608221 A | 5/2016 |

OTHER PUBLICATIONS

Jason Brownlee, "A Tour of Machine Learning Algorithms," Oct. 2015, machinelearningmastery.com, web.archive.org/web/20150910204340/http://machinelearningmastery.com/a-tour-of-machine-learning-algorithms/ (Year: 2015).*

(Continued)

*Primary Examiner* — Ruolei Zong
(74) *Attorney, Agent, or Firm* — Hauptman Ham, LLP

(57) ABSTRACT

An automatic reply method is disclosed, including: receiving a message from an interlocutor and determining a time when the messages are received as a starting time; by means of a pre-trained classifier, obtaining a type of the message; setting a reply time according a preset reply interval and the starting time; when the reply time is reached, invoking a (Continued)

reply message corresponding to the type, making a reply to the message from the interlocutor therefor. An automatic reply device having the same is further disclosed, with the automatic reply method and device to control automatic reply speed of the chatting application software, closer to the speed of artificial reply, and to improve authenticity of simulating the artificial reply and personification of the chatting application software.

12 Claims, 6 Drawing Sheets

(51) Int. Cl.
  *G06F 15/18* (2006.01)
  *G06F 17/27* (2006.01)
  *G06N 20/00* (2019.01)
(58) Field of Classification Search
  USPC .......................................................... 709/206
  See application file for complete search history.

(56) References Cited

U.S. PATENT DOCUMENTS

| | | | |
|---|---|---|---|
| 2005/0282559 A1* | 12/2005 | Erskine | H04M 3/38 455/456.4 |
| 2013/0198862 A1* | 8/2013 | Guo | G06F 21/316 726/28 |
| 2014/0279050 A1* | 9/2014 | Makar | G06Q 30/0269 705/14.66 |
| 2015/0154002 A1* | 6/2015 | Weinstein | G06F 3/167 715/728 |
| 2016/0269326 A1 | 9/2016 | Ji et al. | |

OTHER PUBLICATIONS

International Search Report for PCT/CN2017/077963, dated May 31, 2017, 5 pages.
Written Opinion for PCT/CN2017/077963, dated May 31, 2017, 7 pages.

* cited by examiner

AUTOMATIC REPLY METHOD, DEVICE, APPARATUS, AND STORAGE MEDIUM

FIELD OF THE INVENTION

The present disclosure relates to a field of network technology, and in particular to an automatic reply method, device, apparatus, and computer-readable storage medium.

BACKGROUND OF THE INVENTION

More and more chatting software applications, such as Microsoft ice and xiaohuangji, are capable of talking or chatting with users automatically. However, during chatting, the users may clearly feel unreal human whom are talking with, lacking the sense of reality, and greatly reducing the fun of chatting.

For instance, the chatting robot can simulate the talking or chatting of human, when the chatting robot is talking with the users, since the content that the chatting robot is supposed to reply is pre-given, after the message inputted by the user is received, a corresponding reply sentence is found out to reply to the message at a speed much faster than ordinary artificial reply.

For users, after inputting the chatting message, the chatting robot can reply automatically in very short time, whereas the speed of artificial reply is slower. During conversation, the users may easily figure out the responding message is from the artificial or the chatting robot who is currently making a reply.

Therefore, currently personification of the chatting application software is comparatively low, it fails to provide the users better authenticity of chatting.

SUMMARY OF THE INVENTION

The present disclosure relates to an automatic reply method, device, apparatus, and computer-readable storage medium, aiming to solve the technical problem that personification of the chatting application software is comparatively low.

The automatic reply method provided in the present disclosure includes:

receiving a message from an interlocutor and determining a time when the message is received as a starting time; by means of a pre-trained classifier, obtaining a type of the message; according a preset reply interval and the starting time, setting a reply time; when the reply time is reached, invoking a reply message corresponding to the type, a reply is made to the message from the interlocutor therefor.

In an embodiment, before according to the preset reply interval and the starting time, setting the reply time, the automatic reply method includes:

according to the number of words in the reply message corresponding to the type, and a preset speed rate of typing words, calculating the reply interval.

In an embodiment, before according to the preset reply interval and the starting time, setting the reply time, the automatic reply method includes:

according to a preset chat history, checking out the number of times of the type being chosen during a preset time;

if the number of times of the type being chosen during the preset time is less than a preset number, turning to an executing step: according to the preset reply interval and the starting time, setting the reply time.

In an embodiment, the automatic reply method further includes:

if the type of the message is not successfully obtained, then skipping making a reply to the message.

In an embodiment, the automatic reply method further includes:

by means of preset voice samples, obtaining the classifier based on neural network algorithm and logistic regression algorithm.

The automatic reply device provided in the present disclosure includes:

a receiving module, configured for receiving a message from an interlocutor, and determining a time when the message is received as a starting time; a classification module, configured for by means of a pre-trained classifier, obtaining a type of the message; an setting module, configured for, according to a preset reply interval and the starting time, setting a reply time; a reply module, configured for, when the reply time is reached, invoking a reply message corresponding to the type, making a reply to the message from the interlocutor therefor.

In an embodiment, the automatic reply device further includes:

a calculation module, configured for calculating the reply interval, according to the number of words in the reply message corresponding to the type and a preset speed rate of typing words.

In an embodiment, the automatic reply device further includes:

a query module, configured for, checking out the number of times of the type being chosen during a preset time, according to a preset chat history;

the setting module is further configured for if the number of times of the type being chosen during the preset time is less than a preset number, setting the reply time, according to the preset reply interval and the starting time.

In an embodiment, the automatic reply device further includes:

a refusal module, configured for, if the type of the message is not successfully obtained, then skipping making a reply to the message.

In an embodiment, the automatic reply device further includes:

a training module, configured for, by means of preset voice samples, obtaining the classifier based on neural network algorithm and logistic regression algorithm.

The automatic reply apparatus provided in the present disclosure includes:

a processor;
a network interface;
a storage medium; and
a communication bus;
an automatic reply procedure stored in the storage medium;
the network interface being configured for connecting user devices and communicating data with user devices;
the processer being configured for executing the automatic reply procedure to perform following steps:

receiving a message from an interlocutor, and determining a time when the message is received as a starting time;

by means of a pre-trained classifier, obtaining a type of the message;

according to a preset reply interval and the starting time, setting a reply time; and when the reply time is reached, invoking a reply message corresponding to the type, making a reply to the message from the interlocutor therefor.

In an embodiment, the processer is further configured for executing the automatic reply procedure to perform a following step:

according to the number of words in the reply message corresponding to the type and a preset speed rate of typing words, calculating the number of words in the reply message corresponding to the type and the preset speed rate of typing words to obtain the reply interval.

In an embodiment, the processer is further configured for executing the automatic reply procedure to realize following steps:

according to a preset chat history, checking out the number of times of the type being chosen during a preset time;

if the number of times of the type being chosen during the preset time is less than a preset number, turning to an executing step: according to the preset reply interval and the starting time, setting the reply time.

In an embodiment, the processer is further configured for executing the automatic reply procedure to realize a following step:

if the type of the message is not successfully obtained, then skipping making a reply to the message.

In an embodiment, the processer is further configured for executing the automatic reply procedure to realize a following step:

by means of preset voice samples, obtaining the classifier based on neural network algorithm and logistic regression algorithm.

The computer-readable storage medium provided in the present disclosure stores one or multiple procedures; the one or multiple procedures are capable of being executed by one or multiple processors to perform following steps:

receiving a message from an interlocutor, and determining a time when the message is received as a starting time;

by means of a pre-trained classifier, obtaining a type of the message;

according to a preset reply interval and the starting time, setting a reply time; and when the reply time is reached, invoking a reply message corresponding to the type, making a reply to the message from the interlocutor therefor.

In an embodiment, the one or multiple procedures are capable of being executed by one or multiple processors, to further perform a following step:

according to the number of words in the reply message corresponding to the type, and a preset speed rate of typing words, calculating the number of words in the reply message corresponding to the type and the preset speed rate of typing words to obtain the reply interval.

In an embodiment, the one or multiple procedures are capable of being executed by one or multiple processors, to further perform following steps:

according to a preset chat history, checking out the number of times of the type being chosen during a preset time;

if the number of times of the type being chosen during the preset time is less than a preset number, turning to an executing step: according to the preset reply interval and the starting time, setting the reply time.

In an embodiment, the one or multiple procedures are capable of being executed by one or multiple processors, to further perform a following step:

if the type of the message is not successfully obtained, then skipping making a reply to the message.

In an embodiment, the one or multiple procedures are capable of being executed by one or multiple processors, to further perform a following step:

by means of preset voice samples, obtaining the classifier based on neural network algorithm and logistic regression algorithm.

Embodiments of the present disclosure refer to an automatic reply method and device thereof, after receiving the message from an interlocutor, determining a time when the message is received as a starting time, then by means of a pre-trained classifier, a type of the message is obtained; and according a preset reply interval and the starting time, setting a reply time; when the reply time is reached, invoking a reply message corresponding to the type, making a reply to the message from the interlocutor therefor. By setting reply interval, the present disclosure realizes controlling the automatic reply speed of the chat application software, closer to the speed of artificial reply, therefore, improving the personification of the chat application software.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only about some embodiments of the present invention, and persons of ordinary skill in the art can derive other drawings from the accompanying drawings without creative efforts.

Objective achieving, function features, and advantages of the present disclosure are further described with reference to the embodiments and the accompany drawings.

DETAILED DESCRIPTION OF THE EMBODIMENTS

Technical solutions of the present invention are further described in detail with reference to the accompanying drawings and embodiments. It is to be understood that the specific embodiments described herein are merely used for describing the present invention, but are not intended to limit the present invention.

Figure 1:
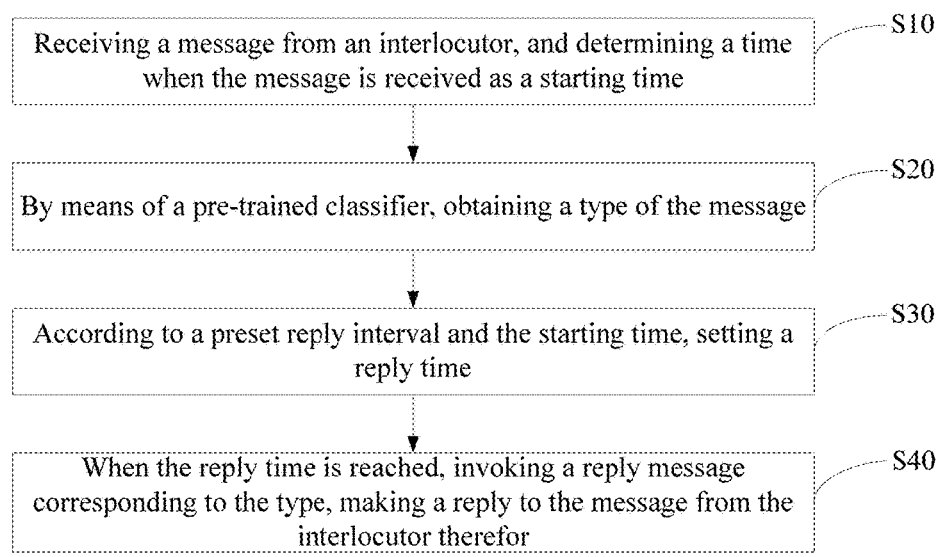
FIG. 1 is a flow chat of an automatic reply method of a first embodiment of the present disclosure.

With reference to FIG. 1, an automatic replay method of the first embodiment of the present disclosure includes steps as follows.

Step S10, receiving a message from an interlocutor, and determining a time when the message is received as a starting time.

The embodiment enables the automatic reply speed of the chat application software to be closer to the speed of artificial reply by controlling automatic reply speed, and thus strengthens the authenticity of chatting and improves users' experience.

In the embodiment, taking a chat robot as the chat application software as an example, the chat robot may simulate chatting or talking of human. The method of the present disclosure is not limited to be applied in the chat robot; in other embodiments, the method can be applied in other application software requiring automatic reply, for example, the method can be applied in social application software such as Wechat and QQ, enabling the chat robot to chat with the interlocutor and automatically reply to the message from someone, or to simulate the chatting between Taobao customer service and consumers to provide customer services.

In an embodiment, the chat robot establishes conditions of chat conversation between the chat robot and the interlocutor, for instance, under the circumstances that the chat robot and the interlocutor become friends in the social software, the chat robot will be automatically triggered to enter into the automatic reply mode; meanwhile, once receiving a triggering message from the interlocutor, the chat robot may dive into the automatic reply mode.

For instance, the triggering message may be read as "How are you", "Hi" and so on, the robot chat may be controlled into the automatic reply mode after receiving the triggering message.

Under the automatic reply mode, the chat robot receives the message from the interlocutor that may be a human or other chat robots, the embodiment takes the human as an example.

The chat message from the interlocutor may be voice or text information and so on. If the chat message from the interlocutor is text information, a corresponding type may be obtained by a classifier directly. If the chat message from the interlocutor is voice information, by means of a voice recognition, the voice information has to be converted into text information that are then classified.

Meanwhile, the robot chat records the time when the message is received, determining the time as a starting time of this conversion.

Step S20, by means of a pre-trained classifier, obtaining a type of the message from the interlocutor.

After receiving the message, the chat robot uses the pre-trained classifier to obtain the type of the message.

More specifically, multiple types have been preset in the classifier, different types are corresponding with different reply messages respectively, and the classifier is capable of identifying mapping unknown type of the message to one of provided types, to obtain the reply message. Different types may be identified with digital labels or other methods.

In one embodiment, after receiving the chat message formed by text information, the text information is divided into various phrases.

After that, the various phrases of the text information are input into the pre-trained classifier, and a targeted type of the various phrases of the text information is subsequently selected according to features of various phrases of the text information.

It needs to illustrate, the targeted type, namely the classification of current chat message is obtained by a mapping of the features of the chat message, that is, different chat messages may target the same type because of the same semantic meaning thereof. However, some chat messages target only one type.

For instance, the chat messages "what kind of product would you like to buy" and "what kind of product do you need to purchase" are divided into various phrases and input to the classifier, these chat messages probably target the same type that the reply message is a specific product.

Step S30, according to a preset reply interval and the starting time, setting a reply time.

After obtaining the targeted type of this message, the chat robot defines the reply time of this conversation according to a preset reply interval.

According to one embodiment of the present disclosure, the preset reply interval is a fixed time.

The chat robot will consequentially define the time when the message is received as the starting time after the chat robot receives the targeted type of the received message, and obtain the time for replying the message received from the interlocutor by adding the time and the preset reply interval.

Furthermore, the preset reply interval is a time set according to different types of the reply messages. The time interval can be flexibly set based on the sematic meaning, the words numbers, and the length of voice etc. of different reply messages, such that the time interval is closer to the speed of artificial reply.

That is, the chat robot defines the reply interval corresponding to the type of the message after receiving the targeted type of the message from the interlocutor.

Sequentially, the time when the message is received namely the starting time adds the reply interval corresponding to the type of the message to define a time, namely the reply time when making a reply to this conversation.

Step S40, when the reply time is reached, invoking a reply message corresponding to the type, making a reply to the message from the interlocutor therefor.

After successfully obtaining the targeted type of the message, the chat robot may take a reply message corresponding to the type, of which, the reply message may be text information, or preset voice information etc. that can be flexibly set according to the actual needs.

When the reply time is reached, making a reply to the message from the interlocutor therefor.

Based on the above mentioned, to make a reply to the message is realized.

After that, if receiving the message from the interlocutor again, determine the starting time again, dive into a new round of automatic reply to the message.

In the embodiment, after receiving the message from the interlocutor, determining the time when the message is received as the starting time, then by means of a pre-trained classifier which is used to divide the message information, obtaining a type of the message; according a preset reply interval and the starting time, setting a reply time; when the reply time is reached, invoking a reply message corresponding to the type, making a reply to the message from the interlocutor therefor. By setting reply interval, the embodiment of the present disclosure realizes controlling the automatic reply speed of the chat application software, closer to the speed of artificial reply, therefore, improving the personification of the chat application software.

Figure 2:
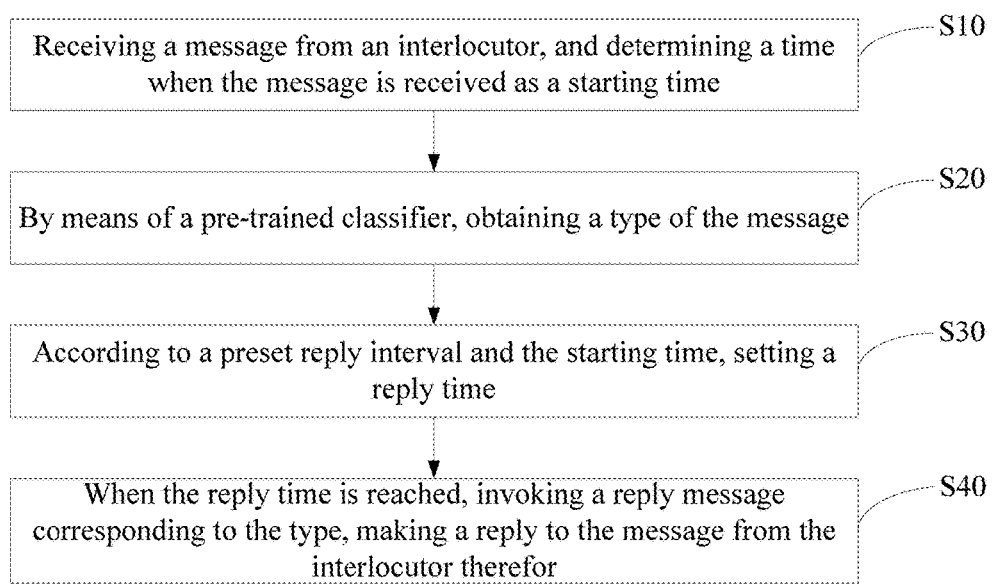
FIG. 2 is a flow chat of an automatic reply method of a second embodiment of the present disclosure.

Furthermore, with reference to FIG. 2, based on the above embodiment in FIG. 1, an automatic reply method of the second embodiment of the present disclosure further includes a step S50 before the step S30.

S50, according to the number of words in the reply message corresponding to the type, and a preset speed rate of typing words, calculating the reply interval.

In the embodiment, the reply message is defined to be the text information, when receiving the chat message from the interlocutor, the chat robot records the time when the message is received.

Then, the chat robot calculates the number of words in the reply message and calculates the reply interval according to the number of words and the preset speed rate of typing. The preset speed rate of typing can also be comprehended as the speed rate of artificial typing, such as one word per second. During calculating the reply interval, the chat robot multiplies the number of words in reply message and the speed rate of typing, to obtain a time namely the reply interval.

After the reply interval is obtained, the chat robot may add the starting time when the message is received and the reply interval, to obtain a reply time when making a reply to this conversation.

Later, the chat robot detects current time, when the reply time is reached, the chat robot makes a reply to the message from the interlocutor.

Since the calculation of obtaining rely message is very quick, the time when the rely message is obtained is not exceeding the reply time when making the reply to this message, and hence controlling of the reply time is not influenced.

In the embodiment, after obtaining the targeted type of this message, calculating the word number of the reply message and the preset speed rate of typing to obtain the reply interval corresponding to this message, then the starting time and the obtained reply interval may determine the reply time when making a reply to this message. The embodiment of the present disclosure by means of the reply interval allocated by the word number of the reply message and the preset speed rate of typing, simulates the speed rate of typing in the artificial reply method so as to set up the scenario of artificial reply, and hence improving the personification of the chat application software.

Figure 3:
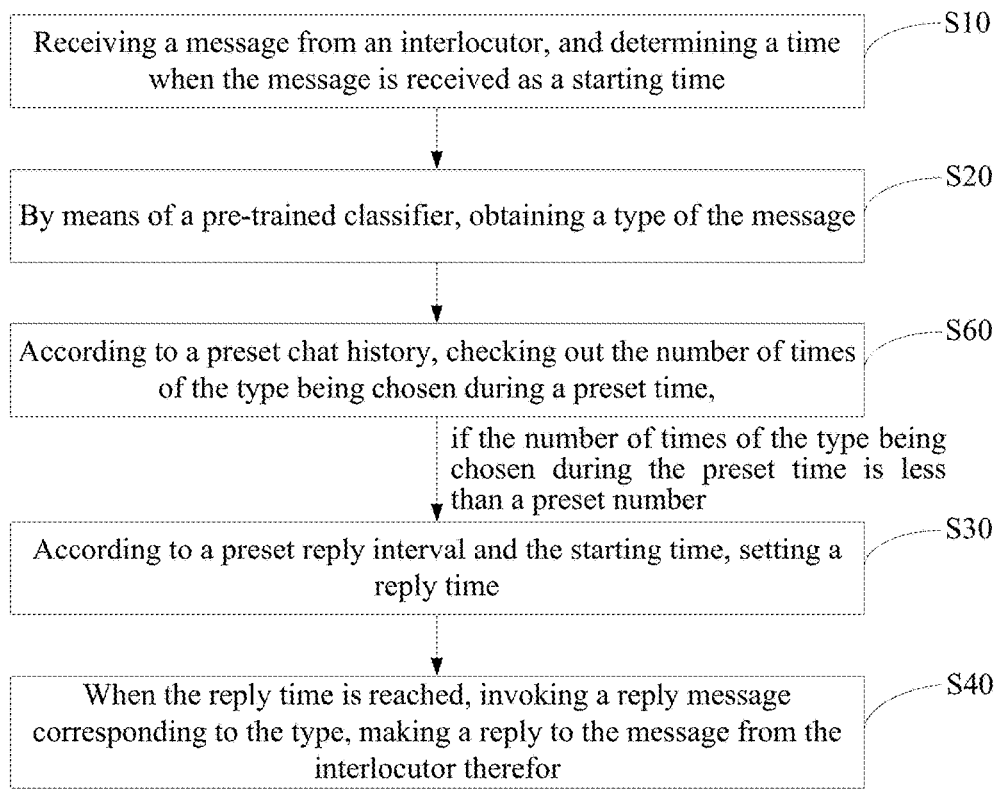
FIG. 3 is a flow chat of an automatic reply method of a third embodiment of the present disclosure.

Furthermore, with reference to FIG. 3, based on the above embodiments in FIG. 1 or FIG. 2, taking the embodiment in FIG. 1 as an example, an automatic reply method of the third embodiment includes a step S60 before the step S30.

Step S60, according to a preset chat history, checking out the number of times of the type chosen during the preset time; if the number of times of the type chosen during the preset time is less than a preset number, turning to an executing step S30.

In the embodiment, the chat robot records each message and each type chosen corresponding to each message as well as each corresponding reply time, to configure the chat history.

When the chat robot obtains the type chosen with this message, according to the configured chat history, to check out whether the type has been chosen during the preset time.

If the type has been chosen by other messages same as or different from this message during the preset time, then calculating the number of times of the type that has been chosen during the preset time. In the embodiment, during calculating, the type chosen with this message currently is not included in the result.

After calculating, judge if the number of times of the type chosen during the preset time is less than a preset number, if yes, the type is valid, and hence make a reply to this conversation, if not, the type is invalid, skip making a reply to this message.

For example, if the preset time is 2 minutes, the preset number is 1.

When the chat robot obtains the type chosen with the message, checking the chat history during the 2 minutes to find out the number of times of the type that has been chosen during the 2 minutes.

If the type chosen during 2 minutes is 1 time, that means, this type of message has been replied during 2 the minutes and the message sent out from the interlocutor is repeated, hence no reply again; if the type chosen during 2 minutes is 0, that means this type of message has never been received during 2 minutes and hence can reply, subsequently setting the reply time, when the reply time is reached, reply the conversation by initiating a reply message corresponding to the type.

In view of above, to manage the same reply messages is realized.

In the embodiment, after obtaining the type chosen with the message, based on the preset chat history, to check out the number of times of the type chosen during the preset time, hence to obtain the number of the message received during the preset time. If the number of times of the type chosen during the preset time is less than a preset number, that is the number of the message received during the preset time is less than the preset number, and hence allocate the reply time to make a reply to this conversation. Embodiment of the present disclosure by means of the preset number, only if the number of the message received during the preset time is less than the preset number it will reply to this message. If the number of the message received during the preset time is too many, hence no reply again, which avoids repeatedly replying to the same type of messages with same reply contents, in line with the habit of people chatting and improves personification of the chat application software.

Figure 4:
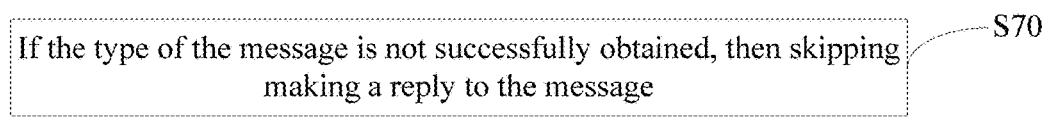
FIG. 4 is a flow chat of an automatic reply method of a fourth embodiment of the present disclosure.

Furthermore, with reference to FIG. 4, based on the embodiments of FIG. 1, FIG. 2 or FIG. 3, an automatic reply method of the fourth embodiment of the present disclosure further includes a step S70.

step S70, if the type of the message is not successfully obtained, skipping making a reply to the message.

In the embodiment, if the type of the message is not successfully obtained, skipping replying to the message.

For instance, when the automatic reply device is applied in a risk test on salesmen in the company, under the circumstances that the salesmen know nothing about it, pretending a customer to test whether the salesmen have violation operations, therefore, to avoid the salesmen' suspicion, automatic reply to the message from the salesmen requires high degree of personification.

If the message from the salesman fails to target the specific type in the classifier, it may be assumed that the message is not in the range of automatic reply, hence skipping replying; if using the preset reply message to reply, or randomly selecting reply message to reply, probably the reply message is not in line with the chat scenario, thus the salesman would suspect the current client of being anomalous, to influence the test result.

In the embodiment, skipping replying to the message if the message fails to target any type can avoid making a messy reply when there is no appropriate reply message, which is more in line with the habit of human chatting, to strengthen personification of the chat application software.

Figure 5:
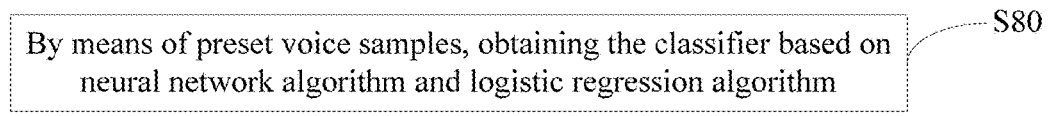
FIG. 5 is a flow chat of an automatic reply method of a fifth embodiment of the present disclosure.

Furthermore, with reference to FIG. 5, based on embodiments according to FIG. 1, FIG. 2, FIG. 3 or FIG. 4, an automatic reply method of the fifth embodiment of the present disclosure further includes a step S80.

Step S80, by means of preset voice samples, obtaining a classifier based on neural network algorithm and logistic regression algorithm.

The embodiment obtains the classifier based on neural network algorithm and logistic regression algorithm by means of preset voice samples.

More specifically, as a real time manner obtaining preset voice samples, the voice samples may be numerous messages, the more the voice samples, the better the training result The classifier may be configured to classify types of voice samples, different type is corresponding to different reply message. Each message in the voice samples is provided with a mapping type, that is, classifying each message in the voice samples and marking a mapping type prepare for the training of the classifier.

Then the voice samples are divided into words. In an embodiment, each sentence from the voice samples is divided into individual words.

Then extracting the feature of the divided voice samples, such as syntactic character.

Then by means of logistic regression algorithm, training classification of each message according to the feature of each message, enabling each message to target a preset type.

When classifying the message, according to the exacted feature of each message, the classifier may target a type with the maximum probability, then judging whether the targeted type of the voice message is successful based on a preset type, repeating the training of classification of each voice message according to the result whether the targeted type of the voice message is successful, as far as possible, the classifier may target a correct type according to the feature of each message.

During the training, by means of neural network algorithm, studying the classifying manner according to the training result of classification of each voice message and rectifying the classifier, which enables the exacted feature of each voice message is the most remarkable, most distinctive with other features of voice messages, and hence improves the success rate of the classifying result.

After the training is over, a testable voice message may be used to test the success rate of the classifier, if the success rate reaches a preset value, determining the training of the classifier is finished; if the success rate does not reach the preset value, continuing to train the classifier until the success rate would reach the preset value.

In the embodiment, training the classifier by means of neural network algorithm and logistic regression algorithm causes the classifier exacts the most remarkable feature of the voice message, and hence the result of classifying the massage is more accurate.

Figure 6:
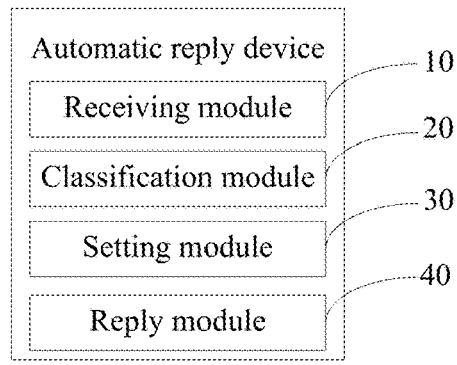
FIG. 6 is a block diagram illustrating an automatic reply device of a first embodiment of the present disclosure.

With reference to FIG. 6, an automatic reply device of the first embodiment of the present disclosure includes a receiving module 10, a classification module 20, a setting module 30, and a reply module 40.

The receiving module 10 is configured for receiving the message from an interlocutor, and determining the time when the message is received as a starting time.

The embodiment controls the speed rate of automatic reply, allowing the automatic reply of the chat application software closer to the artificial reply, strengthens authenticity of chat scenario and improves users' experience.

In an embodiment, establishing conditions of chat conversion between the chat application software and the interlocutor, for instance, under the circumstances that the chat robot and the interlocutor become friends in the social software, the chat robot may be automatically triggered into the automatic reply mode, meanwhile, once receiving a triggering message from the interlocutor, the chat robot may step into the automatic reply mode.

For instance, the triggering message may be read as "How are you" or "Hi", the robot chat may be controlled into the automatic reply mode after receiving the triggering message.

Under the automatic reply mode, the receiving module 10 receives the message from the interlocutor that may be human or other chat robots, the embodiment takes the human as an example.

The chat message from the interlocutor may be voice or text information etc. If the chat message from the interlocutor is text information, a corresponding type may be obtained by a classifier directly. If the chat message from the interlocutor is voice information, the receiving module 10 uses a voice recognition, the voice information has to be converted into text information that are then classified.

Meanwhile, the receiving module 10 records the time when the message is received, determining the time as a starting time of this conversion.

The classification module 20 is configured for, by means of a pre-trained classifier, obtaining a type of the message.

After receiving the message, the classification module 20 uses a pre-trained classifier to obtain the type of the message.

In an embodiment, multiple types have been preset in the classifier, different types are corresponding with different reply messages respectively, and the classifier is capable of identifying mapping unknown type of the message to one of provided types, to obtain the reply message. Of which, different types may be identified by digital labels or other methods.

In an embodiment, after receiving the chat message formed by text information, the classification module 20 divides the text information into various phrases.

After that, the classification module 20 inputs the various phrases of the text information into the pre-trained classifier, and a targeted type of the various phrases of the text information is selected subsequently.

It needs to illustrate, the targeted type, namely the classification of current chat message is obtained by a mapping of the features of the chat message, that is, different chat messages may target the same type because of the same semantic meaning thereof. However, some chat messages target only one type.

For instance, the chat messages "what kind of product would you like to buy" and "what kind of product do you need to purchase" are divided into various phrases and input into the classifier, these chat messages probably target the same type that the reply message is a specific product.

The setting module 30 is configured for, according to a preset reply interval and the starting time, setting a reply time.

After obtaining the targeted type of this message, the setting module 30 defines the reply time of this conversation according to a preset reply interval.

More specifically, according to one embodiment of the present disclosure, the preset reply interval is a fixed time.

After the targeted type of the message is received, by adding time when the message is received, namely the starting time and the preset reply interval, the setting module 30 obtains the time for replying the message received from the interlocutor.

Furthermore, the preset reply interval is a time set according to different types of the reply messages. The time interval can be flexibly set based on the sematic meaning, the words numbers, and the length of voice etc. of different reply messages, such that the time interval is closer to the speed of artificial reply.

That is, the setting module 30 defines the reply interval corresponding to the type of the message after receiving the targeted type of the message from the interlocutor.

Sequentially, the setting module 30 adds the time when the message is received namely the starting time, and the reply interval corresponding to the type of the message to define a time, namely the reply time when making a reply to this conversation.

The reply module 40 is configured for, when the reply time is reached, invoking a reply message corresponding to the type, making a reply to the message from the interlocutor therefor.

After successfully obtaining the targeted type of the message, the reply module 40 may take a reply message corresponding to the type, of which, the reply message may be text information, or preset voice information etc. that can be flexibly configured according to the actual needs.

When the reply time is reached, the reply module 40 makes a reply to the message from the interlocutor therefor.

Based on the above mentioned, to make a reply to the message is realized.

After that, if receiving the message from the interlocutor again, the receiving module 10 determines the starting time again, dive into a new round of automatic reply to the message.

In the embodiment, after the receiving module 10 receives the message from the interlocutor, determining the time when the message is received as the starting time, then the classification module 20, by means of a pre-trained classifier which is used to divide the message information, obtains a type of the message; the setting module 30, according a preset reply interval and the starting time, sets a reply time; when the reply time is reached, the rely module 40 invokes a reply message corresponding to the type, making a reply to the message from the interlocutor therefor. By setting reply interval, the embodiment of the present disclosure realizes controlling the automatic reply speed of the chat application software, closer to the speed of artificial reply, therefore, improving the personification of the chat application software.

Figure 7:
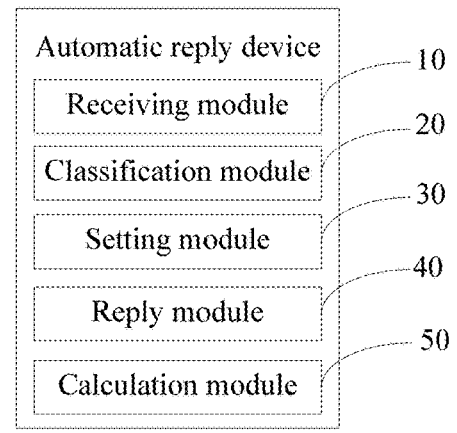
FIG. 7 is a block diagram illustrating an automatic reply device of a second embodiment of the present disclosure.

Furthermore, with reference to FIG. 7, based on the embodiment in FIG. 6, an automatic reply device of the second embodiment of the present disclosure further includes a calculation module 50 configured for, according to the number of words in the reply message corresponding to the type and a preset speed rate of typing words, calculating the reply interval.

In the embodiment, the reply message is defined to be the text information, when the receiving module 10 receives the chat message from the interlocutor, records the time when the message is received.

Then, the calculation module 50 calculates the number of words in the reply message, according to the number of words and the preset speed rate of typing, the robot calculates the reply interval. Of which, the preset speed rate of typing can also be comprehended as the speed rate of artificial typing, such as one word per second. During calculating the reply interval, the calculation module 50 multiplies the number of words in reply message and the speed rate of typing, to obtain a time namely the reply interval.

After the reply interval is obtained, the setting module 30 may add the starting time when the message is received and the reply interval, to obtain a reply time when making a reply to this conversation.

Later, the reply module 40 detects current time, when the reply time is reached, makes a reply to the message from the interlocutor.

Since the calculation of obtaining rely message is very quick, the time when the rely message is obtained is not exceeding the reply time when making the reply to this message, and hence controlling of the reply time is not influenced.

In the embodiment, after obtaining the targeted type of this message, the calculation module 50, based on word number of the reply message and the preset speed rate of typing, calculates the reply interval corresponding to this message, then determines the reply time when making a reply to this message according to the starting time and the obtained reply interval. The embodiment of the present disclosure sets the replay interval based on the word number of the reply message and the preset speed rate of typing, to simulate the speed rate of typing in the artificial reply method so as to set up the scenario of artificial reply, and thus improves the personification of the chat application software.

Figure 8:
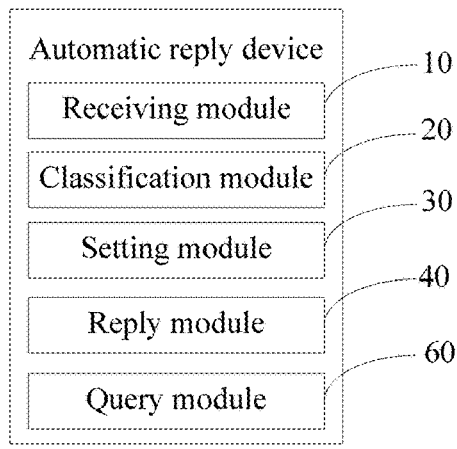
FIG. 8 is a block diagram illustrating an automatic reply device of a third embodiment of the present disclosure.

Furthermore, with reference to FIG. 8, based on the embodiments in FIGS. 6 and 7, taking the embodiment in FIG. 6 as an example, an automatic rely device of the third embodiment of the present disclosure further includes a query module 60 configured for according to a preset chat history, checking out the number of times of the type chosen during the preset time.

The setting module 30 is further configured for if the number of times of the type chosen during the preset time is less than a preset number, according to the preset reply interval and the starting time, setting the reply time.

In the embodiment, the query module 60 records each message and each type chosen corresponding to each message as well as each corresponding reply time, to configure the chat history.

When obtaining the type chosen with this message, the query module 60 checks out whether the type has been chosen during the preset time according to the configured chat history.

If the type has been chosen by other messages same as or different from this message during the preset time, then the query module 60 calculates the number of times of the type that has been chosen during the preset time. In the embodiment, during calculating, the type chosen with this message currently is not included in the result.

After calculating, the query module 60 judges if the number of times of the type chosen during the preset time is less than a preset number, if yes, the query module 60 judges that the type is valid, and thus makes a reply to this conversation, if not, the query module 60 judges that the type is invalid, and skips making a reply to this message.

For example, if the preset time is 2 minutes, the preset number is 1.

When obtaining the type chosen with the message, the query module 60 judges checks the chat history during 2 minutes, to find out the number of times of the type that has been chosen during the 2 minutes.

If the type chosen during 2 minutes is 1 time, that means, this type of message has been replied during the 2 minutes and the message sent out from the interlocutor is repeated, hence no reply again; if the type chosen during 2 minutes is 0, that means this type of message has never been received during the 2 minutes and hence can reply, the setting module 30 subsequently sets the reply time. When the reply time is reached, the reply module 40 replies the conversation with initiating a reply message corresponding to the type.

In view of above, to manage the same reply messages is realized.

In the embodiment, after obtaining the type chosen with the message, based on the preset chat history, the query module 60 checks out the number of times of the type chosen during the preset time to obtain the number of the message received during the preset time. If the number of times of the type chosen during the preset time is less than a preset number, that is, the number of the message received during the preset time is less than the preset number, and hence the setting module 30 sets the reply time when a reply can be made to this conversation. Embodiment of the present disclosure involves the preset number, only if the number of the message received during the preset time is less than the preset number, replying to this message in the conversation. If the number of the message received during the preset time is too many, hence no reply again, which avoids repeatedly replying to the same type of messages with same reply contents, in line with the habit of people chatting and improves personification of the chat application software.

Figure 9:
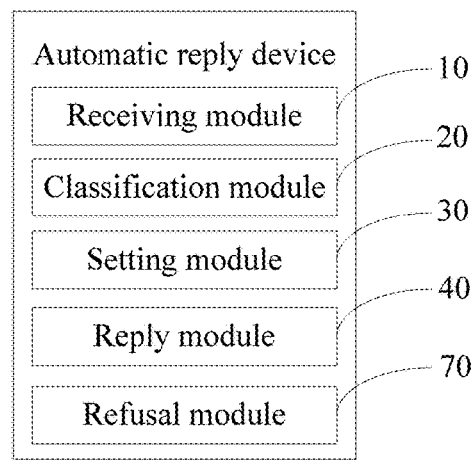
FIG. 9 is a block diagram illustrating an automatic reply device of a fourth embodiment of the present disclosure.

Furthermore, with reference to FIG. 9, based on the embodiments in FIGS. 6, 7 and 8; taking the embodiment in FIG. 6 as an example, the automatic reply device of the fourth embodiment of the present disclosure further includes a refusal module 70 configured for, if the type of the message is not successfully obtained, then skipping making a reply to the message.

In this embodiment, if the type of the message is not successfully obtained, the refusal module 70 skips making a reply to the message.

For instance, when the automatic reply device is applied in a risk test on salesmen in the company, under the circumstances that the salesmen know nothing about it, pretending a customer to test whether the salesmen have violation operations, in case the salesmen suspect, automatic reply to the message from the salesmen requires high degree of personification.

If the message from the salesman fails to target the specific type in the classifier, it may be assumed that the message is not in the range of automatic reply, hence skipping replying; if using the preset reply message to reply, or randomly selecting reply message to reply, probably the reply message is not in line with the chat scenario, thus the salesman would suspect the current client of being anomalous, to influence the test result.

In the embodiment, the refuse module 70 skips replying if the message fails to target any type, thus avoid making a messy reply if there is no appropriate reply message, which is more in line with the habit of human chatting, to strengthen personification of the chat application software.

Figure 10:
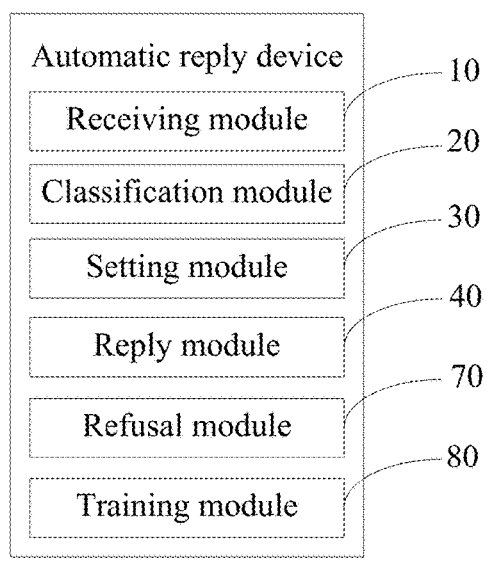
FIG. 10 is a block diagram illustrating an automatic reply device of a fifth embodiment of the present disclosure.

Furthermore, with reference to FIG. 10, based on the embodiments in FIGS. 6, 7, 8 and 9; taking the embodiment in FIG. 9 as an example, an automatic reply device of the fifth embodiment of the present disclosure further includes a training module 80 configured for, by means of preset voice samples, obtaining the classifier based on neural network algorithm and logistic regression algorithm.

The training module 80 of the embodiment obtains the classifier based on neural network algorithm and logistic regression algorithm by means of preset voice samples.

In an embodiment, as a real time manner the training module 80 obtains preset voice samples, the voice samples may be numerous messages, the more the voice samples, the better the training result.

The classifier may be configured to classify types of voice samples, different type is corresponding to different reply message. Each message in the voice samples is provided with a mapping type, that is, classifying each message in the voice samples and marking a mapping type prepare for the training of the classifier.

Then the training module 80 divides the voice samples into words. In an embodiment, the training module 80 divide each sentence from the voice samples into individual words Then the training module 80 extracts the feature of the divided voice samples, such as syntactic character.

Then by means of logistic regression algorithm, the training module 80 classifies each message according to the feature of each message, enabling each message to target a preset type.

When classifying the message, according to the exacted feature of each message, the classifier may target a type with the maximum probability, then judging whether the targeted type of the voice message is successful based on a preset type, repeating the training of classification of each message according to the result whether the targeted type of the message is successful, as far as possible, the classifier may target a correct type according to the feature of each message.

During the training, by means of neural network algorithm, the training module 80 studies the classifying manner according to the result of training of classification of each voice message and rectifying the classifier, which enables the exacted feature of each voice message is the most remarkable, most distinctive with other features of voice messages, and hence improves the success rate of the classifying result.

After the training is over, the training module 80 may use a testable voice message to test the success rate of the classifier, if the success rate reaches a preset value, determining the training of the classifier is finished; if the success rate does not reach the preset value, continuing to train the classifier until the success rate would reach the preset value.

In the embodiment, the training module 80 trains the classifier by means of neural network algorithm and logistic regression algorithm enabling the classifier to exact the most remarkable feature of the voice message, and hence the result of classifying the massage is more accurate.

It is noted that, in hardware implementation, the receiving module 10, the classification module 20, the setting module 30, the reply module 40, the calculation module 50, the query module 60, the refusal module 70, and the training module 80 can be embedded in the automatic reply device as hardware or independent from the automatic reply device, or stored in a memory of the automatic reply device such that a processor can execute these modules to perform corresponding operations. The processor can be a central processing unit (CPU), a micro-processor, or a single chip, etc.

Figure 11:
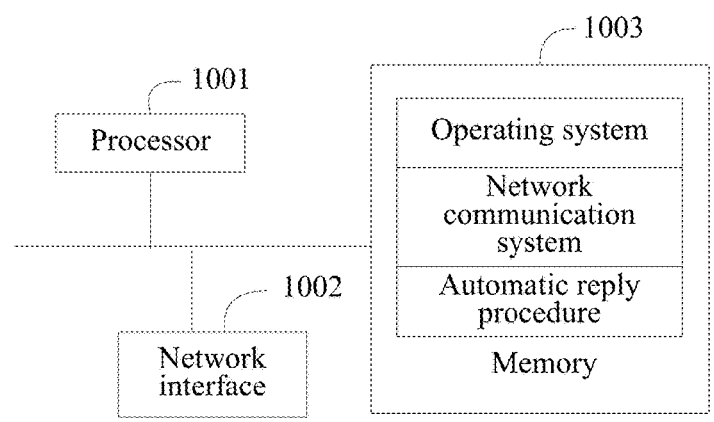
FIG. 11 is a schematic view of an automatic reply apparatus showing hardware application environment of the automatic reply method and the automatic reply device of the above embodiments.

Referring to FIG. 11, which is a schematic view of an automatic reply apparatus showing a hardware application environment of the automatic replay method and the automatic reply device of the above embodiments of the present disclosure.

In some embodiments, the automatic reply apparatus can be a personal computer, a smart mobile phone, a tablet computer, an e-reader, or a portable computer terminal, etc.

As shown in FIG. 11, the automatic reply apparatus includes a processor 1001, e.g. a CPU, a network interface 1002, and a storage medium 1003. The processor 1001, the network interface 1002, and the storage medium 1003 communicates with each other through a system bus. The network interface 1002 can be a standard wired interface or a wireless interface (e.g., a WI-FI interface). The storage medium 1003 can be a high speed RAM or a stable non-volatile memory such as a disk memory.

In other embodiments, the automatic reply apparatus may further include a user interface, a camera, a radio frequency (RF) circuit, a sensor, an audio circuit, and a WIFI module. The user interface may include a display, an input unit such as a keyboard. It is understood that the user interface can be wired or wireless.

It is understood that the structure shown in FIG. 11 does not intend to limit the automatic reply apparatus to this embodiment. In other embodiments, the automatic reply apparatus may include more or less components, or combine some components, or have a different arrangement of these components.

The storage medium 1003 may store an operation system, a network communication module, and an automatic reply grogram. The operation system includes programs for managing and controlling hardware and software of the automatic reply device, thereby supporting the operation and execution of the network communication module, the automatic replay program, and other programs. The network communication module is configured for managing and controlling the network interface 1002.

The network interface 1002 is configured for connecting and communicating with at least one user device, wherein an interlocutor inputs message to the user device and the user device sends the message to the automatic reply apparatus. The processor 1001 is configured for executing the automatic reply program stored in the storage medium 1003 to perform following steps:

receiving a message from an interlocutor, and determining a time when the message is received as a starting time;

by means of a pre-trained classifier, obtaining a type of the message;

according to a preset reply interval and the starting time, setting a reply time; and when the reply time is reached, invoking a reply message corresponding to the type, making a reply to the message from the interlocutor therefor.

In an embodiment, the processor 1001 is further configured for executing the automatic reply program stored in the memory 1003 to perform a following step:

according to the number of words in the reply message corresponding to the type and a preset speed rate of typing words, calculating the number of words in the reply message corresponding to the type and the preset speed rate of typing words to obtain the reply interval.

In an embodiment, the processer 1001 is further configured for executing the automatic reply program stored in the storage medium 1003 to perform following steps:

according to a preset chat history, checking out the number of times of the type being chosen during a preset time; and if the number of times of the type being chosen during the preset time is less than a preset number, turning to an executing step: according to the preset reply interval and the starting time, setting the reply time.

In an embodiment, the processer 1001 is further configured for executing the automatic reply program stored in the storage medium 1003 to perform a following step:

if the type of the message is not successfully obtained, then skipping making a reply to the message.

In an embodiment, the processor 1001 is further configured for executing the automatic reply program stored in the storage medium 1003 to perform a following step:

by means of preset voice samples, obtaining the classifier based on neural network algorithm and logistic regression algorithm.

Embodiments of the automatic reply apparatus are similar to those of the automatic reply method and automatic reply device as described above, which are not given in detail hereinafter again.

The present disclosure further provides a computer-readable storage medium; one or multiple programs are stored in the storage medium; the one or multiple programs are capable of being executed by one or multiple processors to perform following steps:

receiving a message from an interlocutor, and determining a time when the message is received as a starting time;

by means of a pre-trained classifier, obtaining a type of the message;

according to a preset reply interval and the starting time, setting a reply time; and when the reply time is reached, invoking a reply message corresponding to the type, making a reply to the message from the interlocutor therefor.

In an embodiment, the one or multiple programs are capable of being executed by one or multiple processors, to further perform a following step:

according to the number of words in the reply message corresponding to the type, and a preset speed rate of typing words, calculating the number of words in the reply message corresponding to the type and the preset speed rate of typing words to obtain the reply interval.

In an embodiment, the one or multiple programs are capable of being executed by one or multiple processors, to further perform following steps:

according to a preset chat history, checking out the number of times of the type being chosen during a preset time;

if the number of times of the type being chosen during the preset time is less than a preset number, turning to an executing step: according to the preset reply interval and the starting time, setting the reply time.

In an embodiment, the one or multiple programs are capable of being executed by one or multiple processors, to further perform a following step:

if the type of the message is not successfully obtained, then skipping making a reply to the message.

In an embodiment, the one or multiple programs are capable of being executed by one or multiple processors, to further perform a following step:

by means of preset voice samples, obtaining the classifier based on neural network algorithm and logistic regression algorithm.

Embodiments of the storage medium are similar to those of the automatic reply method and automatic reply device as described above, which are not given in detail hereinafter again.

It should also be noted that in this article the term "includes", "comprises", or any other variant thereof, is intended to mean not exclusive in inclusion, so that a process, method, article, or device containing a set of elements not only includes those elements, but also other elements not explicitly listed, or an inherent element of the process, method, article, or device. Without further restrictions, the element restricted by the phrase or sentence "include a . . . " does not exclude other same elements from the process, method, article, or device.

The serial numbers of the above embodiments are only used for illustration and are not intended to represent advantages and disadvantages of these embodiments. A person skilled in the art should understand that the processes of the methods in the above embodiments can be, in full or in part, implemented by computer programs instructing underlying hardware, the programs can be stored in a computer-readable storage medium, the program can include the processes in the embodiments of the various methods when it is being executed. The storage medium can be a disk, a CD, a Read-Only Memory (ROM) and other non-transitory storage mediums or a RAM and so on.

The foregoing descriptions are merely embodiments of the present invention, and are not intended to limit the scope of the present invention. An equivalent structural or equivalent process alternation made by using the content of the specification and drawings of the present invention, or an application of the content of the specification and drawings directly or indirectly to another related technical field, shall fall within the protection scope of the present invention.

What is claimed is:

1. An automatic reply method, which is applied to an automatic reply terminal, comprising:
   receiving a message from an interlocutor, and determining a time when the message is received as a starting time;
   by means of a pre-trained classifier, obtaining a type of the message;
   according to a preset reply interval and the starting time, setting a reply time; and
   when the reply time is reached, invoking a reply message corresponding to the type, making a reply to the message from the interlocutor therefor;
   wherein, before the step of according to the preset reply interval and the starting time, setting the reply time, the method further comprises:
   checking out the number of times of the type being chosen during a preset time, according to a preset chat history; and
   if the number of times of the type being chosen during the preset time is less than a preset number, turning to an executing step: setting the reply time according to the preset reply interval and the starting time.

2. The automatic reply method of claim 1, wherein before the step of according to the preset reply interval and the starting time, setting the reply time, the automatic reply method further comprises:
   according to the number of words in the reply message corresponding to the type, and a preset speed rate of typing words, calculating the number of words in the reply message corresponding to the type and the preset speed rate of typing words to obtain the reply interval.

3. The automatic reply method of claim 1, further comprising:
   if the type of the message is not successfully obtained, then skipping making a reply to the message.

4. The automatic reply method of claim 3, further comprising:
   by means of preset voice samples, obtaining the classifier based on neural network algorithm and logistic regression algorithm.

5. An automatic reply device, wherein the automatic reply device comprises a processor and a memory coupled to the processor, the memory stores programmed instruction units executable by the processor and comprising:
   a receiving module, configured for receiving a message from an interlocutor, and determining the time when the message is received as a starting time;
   a classification module, configured for, by means of a pre-trained classifier, obtaining a type of the message;
   a setting module, configured for, according to a preset reply interval and the starting time, setting a reply time; and
   a reply module, configured for, when the reply time is reached, invoking a reply message corresponding to the type, making a reply to the message from the interlocutor therefor;
   wherein, the programmed instruction units further comprises:
   a query module, configured for checking out the number of times of the type being chosen during a preset time according to a preset chat history; and
   the setting module, further configured for, setting the reply time according to the preset reply interval and the starting time, if the number of times of the type being chosen during the preset time is less than a preset number.

6. The automatic reply device of claim 5, the programmed instruction units further comprising:
   a calculation module, configured for, according to the number of words in the reply message corresponding to the type and a preset speed rate of typing words, calculating the reply interval.

7. The automatic reply device of claim 5, the programmed instruction units further comprising:
   a refusal module, configured for, if the type of the message is not successfully obtained, skipping making a reply to the message.

8. The automatic reply device of claim 7, the programmed instruction units further comprising:
   a training module, configured for, by means of preset voice samples, obtaining the classifier based on neural network algorithm and logistic regression algorithm.

9. An automatic reply apparatus comprising:
   a processor;
   a network interface;
   a storage medium; and
   a communication bus;
   an automatic reply grogram stored in the storage medium;
   the network interface being configured for connecting user devices and communicating data with user devices;
   the processer being configured for executing the automatic reply program to perform following steps:
   receiving a message from an interlocutor, and determining a time when the message is received as a starting time;
   by means of a pre-trained classifier, obtaining a type of the message;
   according to a preset reply interval and the starting time, setting a reply time; and
   when the reply time is reached, invoking a reply message corresponding to the type, making a reply to the message from the interlocutor therefor;
   wherein, the processer is further configured for executing the automatic reply program to perform following steps:
   checking out the number of times of the type being chosen during a preset time according to a preset chat history; and
   if the number of times of the type being chosen during the preset time is less than a preset number, turning to an executing step: setting the reply time according to the preset reply interval and the starting time.

10. The automatic reply apparatus of claim 9, wherein the processer is further configured for executing the automatic reply program to perform a following step:

according to the number of words in the reply message corresponding to the type and a preset speed rate of typing words, calculating the number of words in the reply message corresponding to the type and the preset speed rate of typing words to obtain the reply interval.

11. The automatic reply apparatus of claim 9, wherein the processer is further configured for executing the automatic reply program to perform a following step:

if the type of the message is not successfully obtained, then skipping making a reply to the message.

12. The automatic reply apparatus of claim 11, wherein the processer is further configured for executing the automatic reply program to perform a following step:

by means of preset voice samples, obtaining the classifier based on neural network algorithm and logistic regression algorithm.

\* \* \* \* \*